Figure 3:
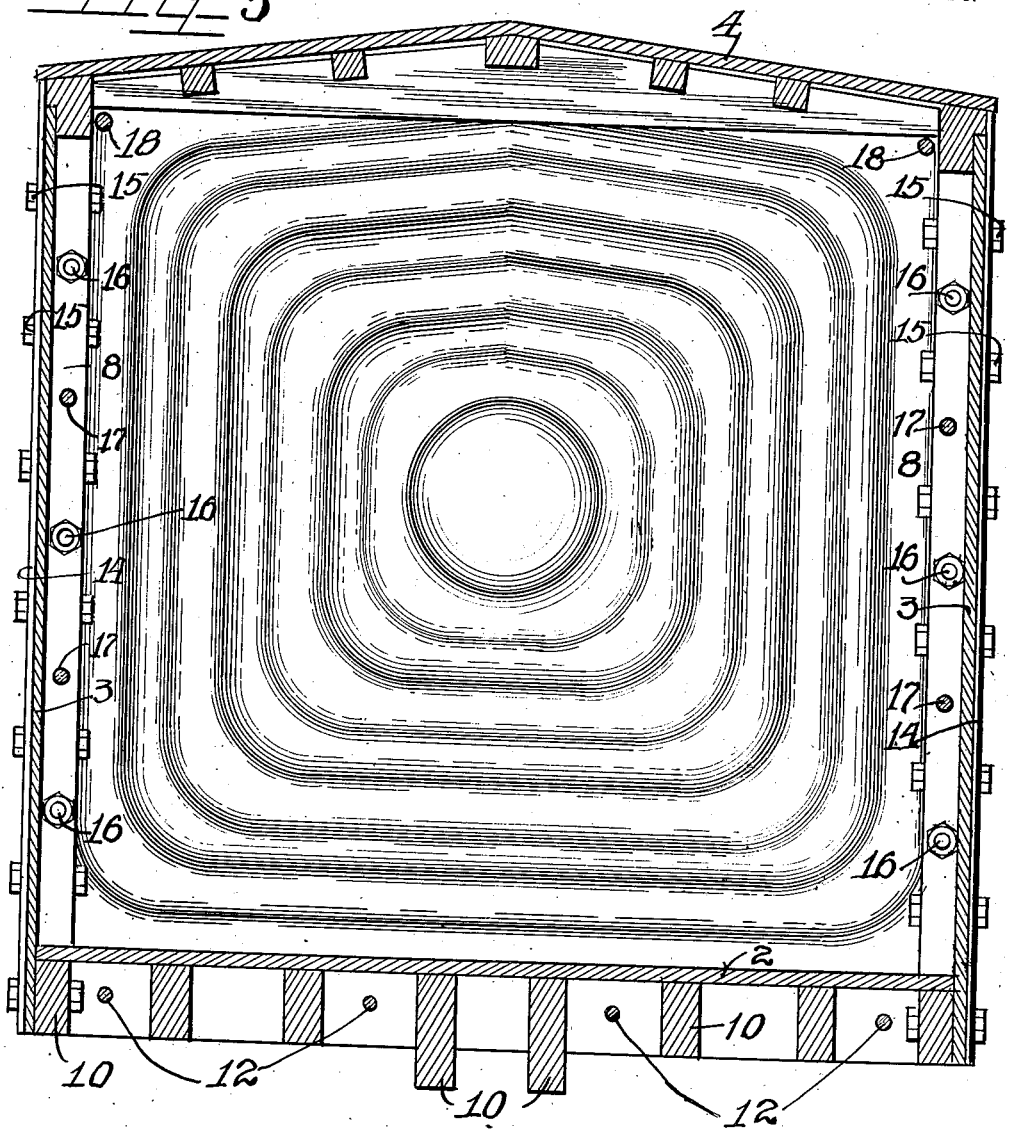

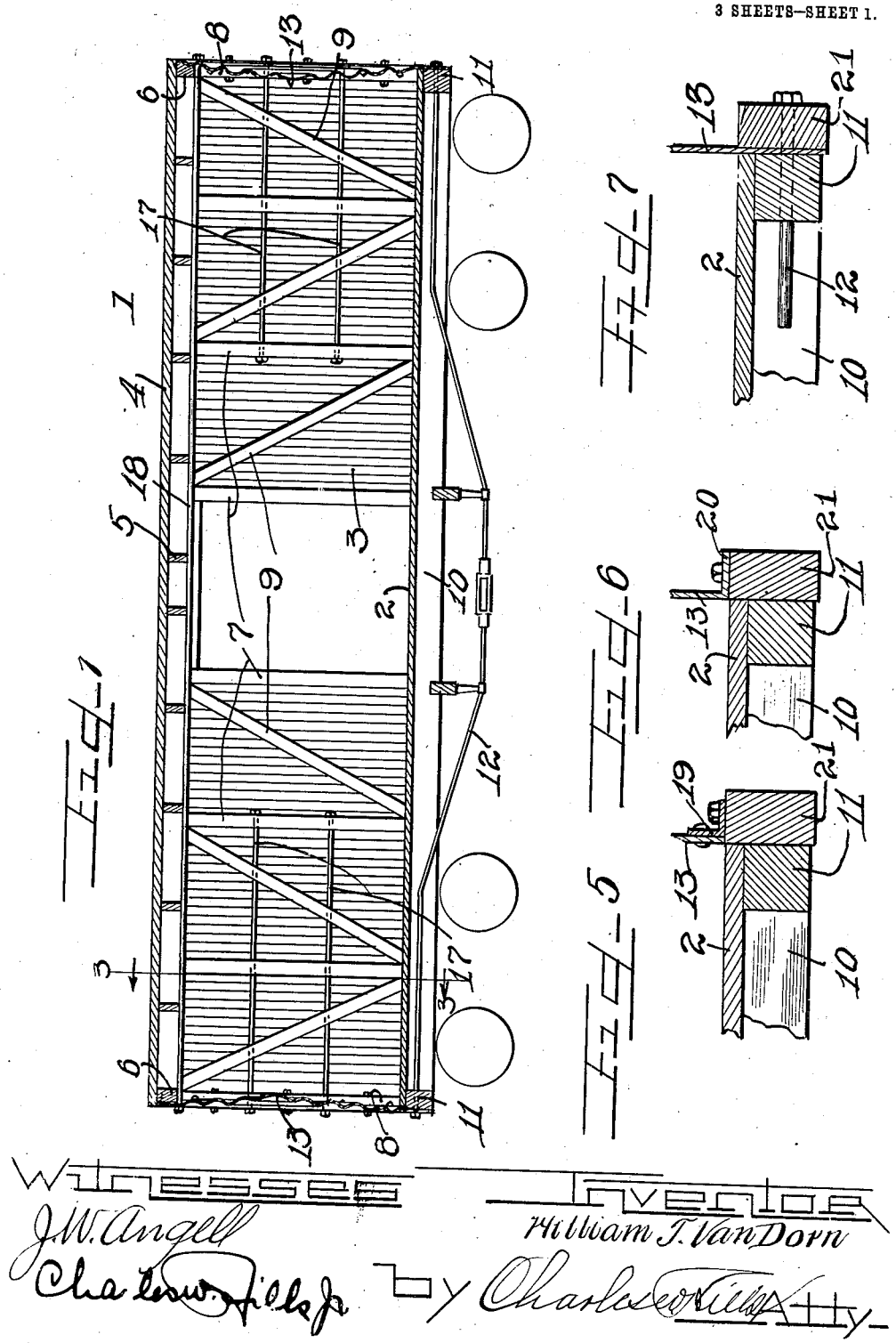

W. T. VAN DORN.
ATTACHING MEANS FOR CAR ENDS.
APPLICATION FILED MAR. 24, 1913.
1,074,225.
Patented Sept. 30, 1913.
3 SHEETS—SHEET 2.
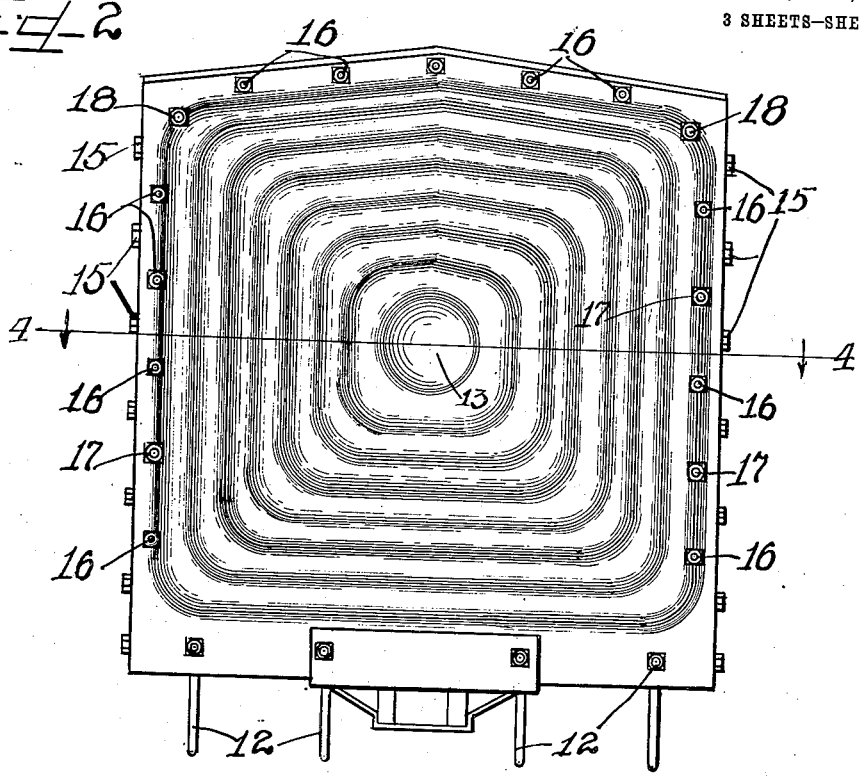
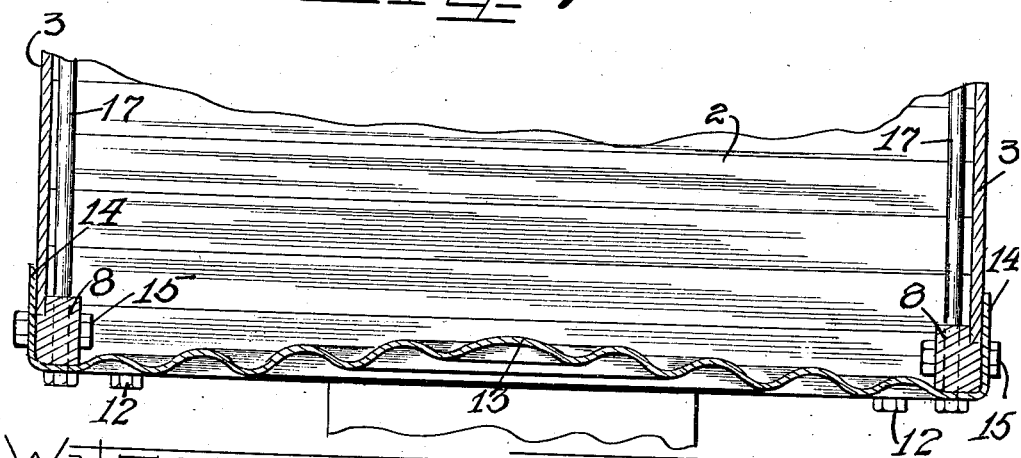

W. T. VAN DORN.
ATTACHING MEANS FOR CAR ENDS.
APPLICATION FILED MAR. 24, 1913.

1,074,225.

Patented Sept. 30, 1913.

3 SHEETS—SHEET 3.

UNITED STATES PATENT OFFICE.

WILLIAM T. VAN DORN, OF CHICAGO, ILLINOIS.

ATTACHING MEANS FOR CAR ENDS.

1,074,225.  Specification of Letters Patent.  Patented Sept. 30, 1913.

Application filed March 24, 1913. Serial No. 756,372.

*To all whom it may concern:*

Be it known that I, WILLIAM T. VAN DORN, a citizen of the United States, and a resident of the city of Chicago, in the county of Cook and State of Illinois, have invented certain new and useful Improvements in Attaching Means for Car Ends; and I do hereby declare that the following is a full, clear, and exact description of the same, reference being had to the accompanying drawings, and to the numbers of reference marked thereon, which form a part of this specification.

Heretofore a troublesome feature in connection with wooden freight cars has been the breaking away of the ends thereof from the car frame, permitting a loss of the contents of the car. Such breaking away or destruction of the car end is in most cases due to the constant buffing stresses to which the same are subjected in the transfer thereof from place to place. The side walls, top, and bottom of a car are very seldom injured by foreign objects coming into their path, while on the other hand, the car ends are often battered and even a partial destruction thereof is of serious consequence. Various metallic ends have been devised to replace the frail wooden ends of such cars, and in most cases, although the same have been sufficiently strong in themselves to withstand the inertia of the contents of the car when the train is brought to a sudden stop, or suddenly set in motion, such ends have been attached to the end members of a car frame in a manner inadequate to prevent tearing away of the ends from the frame when subjected to the enormous stresses due to buffing.

This invention relates to means for securing a car end to a car frame in a manner adapted to retain the ends thereon under the most severe conditions, and also serving to reinforce the car frame as a whole.

It is an object of this invention to provide tie rods for connecting the opposite car ends so that the same are directly connected together and the stress imposed on one end will be communicated to the other and transmitted to the car frame as a whole as a compressive stress.

It is also an object of this invention to provide a means for securing a metallic car end to the intermediate members of a car frame.

It is also an object of this invention to provide attaching means for a car end wherein the truss rods of the car frame serve to secure the ends thereon and tie the same together.

It is also an object of this invention to provide means for attaching a car end to the corner posts of the car frame both transversely and longitudinally thereof with respect to the car frame.

It is also an object of this invention to provide a car end capable of being attached to the dead block or end sill, or both of said members, of a car frame.

It is also an object of this invention to provide tie rods extending the entire length of the car at the top of the car, and serving to clamp the car ends on the respective ends thereof to the respective end plates of the car frame, so that the stress imposed on one car end will be transmitted to the other car end.

It is also an object of this invention to provide a detachable car end secured to the corner posts, end sill, and end plate of a car frame.

It is also an object of this invention to provide a detachable car end attached along all of its edges to the car frame and of such a form as to tend to spread toward the edges when stressed by the contents of the car.

It is furthermore an object of this invention to secure a car end on a car frame at a plurality of points otherwise than on the end members of said frame.

It is finally an object of this invention to suitably reinforce the entire car structure by the attaching means for the car end.

The invention (in a preferred form) is illustrated in the drawings, and hereinafter more fully described.

In the drawings: Figure 1 is a central, longitudinal, vertical section taken through an ordinary wooden box car equipped with metallic car ends attached by means embodying the principles of my invention. Fig. 2 is a fragmentary end elevation of the same. Fig. 3 is a transverse vertical section taken on line 3—3 of Fig. 1, with the sway bracing omitted. Fig. 4 is a fragmentary, transverse horizontal section taken on line 4—4 of Fig. 2. Figs. 5 and 6 illustrate different methods for attaching the car ends to the end members of the car frame. Fig. 7 illustrates a means of securing the car end between the end sill and the dead block by means of the truss rods of the car frame.

As shown in the drawings: An ordinary freight box car indicated as a whole by the reference numeral 1, is provided with a floor 2, and side walls 3. A roof 4, is supported upon the transverse carlines 5, intermediate the ends of the car frame, and the end of said roof is supported upon the end plate members 6. The roof structure is suitably supported upon a plurality of intermediate posts 7, and end posts or corner posts 8, which are provided therebetween with sway bracing members 9, to reinforce the same.

The longitudinally extending sill members 10, afford a support for the floor 2, and form a part of the under framing of the car, and on the ends thereof, are secured end sills 11, which are tied together to reinforce said under framing by means of the truss rods 12. A metallic car end 13, is secured along its edges to the end members of the car frame, which comprise respectively the end plate 6, end sill 11, and the corner or end posts 8. As more particularly shown in detail in Fig. 4, the side edges 14, of said car end 13, are flanged over to engage around the outer surface of the corner posts 8, on each side of the frame, and bolts 15, extend through said flange 14, and the corner post, to firmly secure the car end flange thereon. Likewise bolts 16, extend through the front face of the metallic car end and through the corner posts, and through the end plate member 6, to positively retain the car end thereon. For the purpose of additional support, and in order to relieve the end members of the car framing from the entire stress imposed upon the car end, longitudinal tie rods 17, extend through the corner posts to the outer side of the metallic car end, and on the interior of the car extend longitudinally for a portion of the length thereof and are then secured upon one of the intermediate posts 7. A pair of continuous longitudinal tie rods 18, extend from one end of the car to the other, and are secured upon the outer faces of the metallic car ends to tie the same together and reinforce the car frame as a whole. Said car end members 13, comprise an integral sheet of metal which is corrugated and dished inwardly, said corrugations being continuous and extending substantially parallel to the top, sides and bottom of the car, and affording in appearance a bull's-eye.

As shown in Fig. 5, the lower edge of the metallic car end 13, is secured to the dead block 21, by means of the angle iron 19, which is riveted to the margin of the car end and bolted to the dead block. As shown in Fig. 6, the car end is provided with the integral out turned flange 20, which is bolted to the dead block 21, in the usual manner.

In the modification shown in Fig. 7, the lower edge of the car end extends over the rear surface of the block 21, and is engaged thereon, and between the same and the end sill 11, by means of the truss rods 12, so that in this construction as well as that shown in Fig. 1, the car ends are connected or tied together at their lower edges by means of the truss rods of the car frame.

The operation is as follows: Attaching the car end to the car frame by means of bolts permits the end to be readily removed therefrom at any time for repair or replacement, if so desired, as well as affording means for taking up upon the same at any point, should it become sprung from the car body. In prior constructions, the car end has been mounted entirely upon the end members of the car frame, and these, as usually constructed, are of insufficient strength to withstand the stresses imposed upon the car ends, when the car is suddenly set in motion or brought to a sudden stop. In my invention I distribute the stress throughout the car frame by means of the short tie rods 17, and the continuous tie rods 18, as well as the truss rods 12, of the car frame. Due to the fact that the car end is dished inwardly, any force exerted thereon from within the car, will tend to spread the edges thereof over the end members of the car frame rather than tear the edges away from the same. However, because of the rigidity of attachment of the edges of the car end to the car frame, in event of accident, the end will be distorted before the edges thereof are torn away from their attaching means, due to the corrugations in the surface of the car end. Car ends so constructed will undergo a certain amount of deformation before becoming detached from the car frame. Due to the fact that the car end is also secured upon the car frame by means of the longitudinal tie rods 18, and truss rods 12, any force exerted on the interior of the car end due to a sudden starting or stopping of the car, will cause the stress thereon to be transmitted to the opposite car end, and the force will then be communicated to the car frame as compression throughout its length, instead of a tensile force applied directly on the end frame members.

Although I have shown and described my invention as associated with a wooden box car, it is obvious that it may be so used in any type of car, however it may be constructed.

I am aware that details of construction may be varied through a wide range without departing from the principles of this invention, and I therefore do not purpose limiting the patent granted otherwise than necessitated by the prior art.

I claim as my invention:

1. The combination with the end members of a car frame, of a car end secured thereon, means tying the same to intermediate members of the car frame, and integral continuous means at the top of the car for tying the opposite car ends together.

2. The combination with a car frame of car ends secured thereon, straight and parallel continuous tie rods extending the entire length of said car and secured on said car ends, and integral means on said car ends permitting a continuous connection to be effected between said opposite ends by means of the truss rods of the car frame.

3. In a car frame the combination with the corner posts thereof, of a metallic car end flanged therearound, and bolts secured alternately transversely and longitudinally, relative the car, through said corner posts and car ends, to secure the same together.

4. Means for attaching a car end to a car frame comprising tie rods extending through the car frame and car ends and secured at points intermediate the length of the car frame and to said car ends, and continuous tie rods extending the length of the top of the car and securing the opposite car ends one to another.

5. In means for attaching a metallic car end to a car frame, the combination of extended flanges on said car end, longitudinal and transverse bolts extending therethrough, and one of said flanges adapting the truss rods of the car frame to extend therethrough to tie the opposite car ends together and to reinforce and strengthen the car frame.

6. Means for attaching a metallic car end to a car body comprising means for transmitting the stress imposed on one car end directly to the other opposite car end.

7. The combination with an end sill and corner posts of a railway car, of a sheet metal end secured to said sill and posts, said end dished inwardly affording an outwardly concave surface.

8. The combination with the car frame of a railway car, of a metal end structure, longitudinal and transverse means securing the same to the end members of said car frame, and means securing the same to the intermediate members of said car frame.

9. The combination with the truss rods, end sill, intermediate posts, and corner posts of a car frame, of a metal end structure, attaching means thereon affording connection on the end sills by means of said truss rods, tie rods connecting said metal end with the intermediate posts of the car frame, and means attaching the edge of said ends transversely and longitudinally of the car through said corner posts.

10. The combination with the body of a railway car, of end structures consisting of an outwardly concaved concentrically corrugated sheet of metal, means attaching the same to the end members of said car frame, and means securing said end structures together, and to intermediate members of said car body.

11. The combination with a car frame, of an outwardly dished metallic end, means attaching the same to the end members of said car frame, and tie rods connecting said end with the intermediate members of said car frame, and with the opposite similar end on the car.

12. The combination of a car body and a metallic end therefor, of an extended flange on said metallic end extending over the rear surface of the end sill of the car, and a truss rod securing the same thereon and between the sill and the dead block of the car to securely retain the metallic end upon the car, and tie rods extending longitudinally of the car at the top thereof, and secured at each of their ends to the metallic car ends.

13. In means for attaching car ends to a car frame, the combination of extended flanges on said car ends, longitudinal and transverse bolts extending through said flanges, and the end members of said car frame, and tie rods extending along the top of the car and parallel said longitudinal bolts and connected to intermediate members of the car frame.

14. In means for attaching car ends to a car frame, the combination with extended flanges on said car ends, with longitudinal and transverse bolts extending through said flanges and through the corner posts of said car frame, and a plurality of tie rods extending through said flanges and corner posts and secured respectively to the opposite car ends and to intermediate members of the car frame.

15. The combination with the end members of a car frame, of a car end secured thereon, said end dished inwardly affording an outwardly concave surface, means tying the car ends to intermediate members of the car frame, and means at the top of the car for tying the opposite car ends together.

16. A car end comprising a sheet of metal adapted to be secured to a car frame at its margins and dished inwardly affording a convex surface on one side and a concave surface on the other thereof.

17. The combination with a railway car frame, of end members comprising inwardly dished sheets of metal, and means attaching the same to the end elements of said car frame.

18. A car end comprising an inwardly dished concentrically corrugated sheet of metal.

19. A car end comprising a unitary inwardly dished sheet of metal.

In testimony whereof I have hereunto subscribed my name in the presence of two subscribing witnesses.

WILLIAM T. VAN DORN.

Witnesses:
CHARLES W. HILLS, Jr.,
LEON M. REIBSTEIN.